United States Patent [19]

Uematsu

[11] Patent Number: 4,472,597
[45] Date of Patent: Sep. 18, 1984

[54] WATER IMPERVIOUS RUBBER OR PLASTIC INSULATED POWER CABLE

[75] Inventor: Tadayuki Uematsu, Chiba, Japan

[73] Assignee: The Furukawa Electric Co., Ltd., Tokyo, Japan

[21] Appl. No.: 483,499

[22] Filed: Apr. 11, 1983

[30] Foreign Application Priority Data

Apr. 12, 1982 [JP] Japan .............................. 57-51800[U]

[51] Int. Cl.³ .............................................. H01B 7/28
[52] U.S. Cl. ......................... 174/106 SC; 174/106 R; 174/107
[58] Field of Search .............. 174/106 R, 106 SC, 107

[56] References Cited

U.S. PATENT DOCUMENTS

| | | | |
|---|---|---|---|
| 2,132,259 | 10/1938 | Emanueli | 174/107 |
| 2,446,387 | 8/1948 | Peterson | 174/106 SC |
| 2,948,772 | 8/1960 | Bopp | 174/107 |
| 3,472,692 | 10/1969 | Isshiki | 174/106 SC |
| 3,507,978 | 4/1970 | Jachimowicz | 174/107 |
| 3,575,748 | 4/1971 | Polizzano | 174/107 X |
| 4,342,880 | 8/1982 | Castelli et al. | 174/106 SC X |
| 4,360,704 | 11/1982 | Madry | 174/107 X |
| 4,398,058 | 8/1983 | Gerth et al. | 174/107 |

FOREIGN PATENT DOCUMENTS

| | | | |
|---|---|---|---|
| 405209 | 2/1965 | Japan . | |
| 1375677 | 11/1974 | United Kingdom | 174/107 |
| 886417 | 1/1982 | United Kingdom . | |

*Primary Examiner*—G. P. Tolin
*Assistant Examiner*—Morris H. Nimmo
*Attorney, Agent, or Firm*—Frishauf, Holtz, Goodman & Woodward

[57] ABSTRACT

A rubber or plastic insulated power cable is provided wherein a water impervious tape is formed on a cable core through an electrically conductive tape. Fracture due to fatigue of the metal foil of the water impervious tape which is caused by friction between a metal shield layer of the cable core and a jacket as an outermost layer is prevented. Water impervious performance of the cable is not degraded over a long period of time.

3 Claims, 2 Drawing Figures

F I G. 2
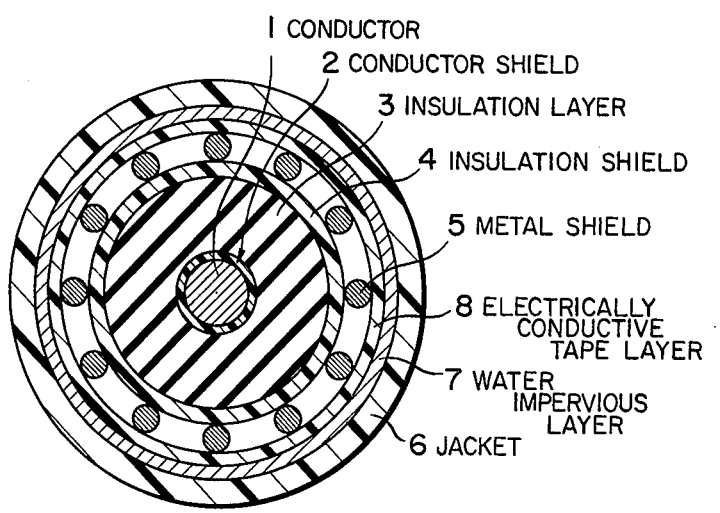

WATER IMPERVIOUS RUBBER OR PLASTIC INSULATED POWER CABLE

BACKGROUND OF THE INVENTION

The present invention relates to an improved water impervious rubber or plastic insulated power cable.

A power cable insulated with rubber or plastic has a basic structure as shown in FIG. 1. Referring to FIG. 1, a conductor shield 2, an insulation layer 3, an insulation shield 4, a metal shield layer 5, and a jacket 6 are formed in the order named around a conductor 1.

In the conventional cable of this type, a water impervious layer 7 is formed below the jacket 6 so as to prevent water infiltration from outside the cable for application in the fields of communication and power transmission cables. The water impervious layer 7 comprises an aluminum laminated tape, each surface of which is coated with polyethylene, and is bonded to the jacket 6 by the heat generated during extrusion coating of the jacket 6. However, the polyethylene in the aluminum laminated tape (hereinafter referred to as "water impervious tape") used in the water impervious layer 7 has a high insulation characteristic. For this reason, when a voltage is induced in the metal (aluminum) layer of the water impervious layer 7 or a surge voltage is applied to the cable, a potential difference is established between the metal layer of the water impervious layer 7 and the metal shield layer 5 on the cable core. When the polyethylene layer of the water impervious tape breaks down because of such a potential difference, a pinhole is formed in the metal layer of the thin water impervious tape by an arc generated at the time of breakdown. Then, the water impervious layer 7 loses its water-resistant and water-impervious characteristics. The cable insulation may then be degraded by water or chemicals which infiltrate through such a pinhole in the water impervious layer 7, resulting in lower performance or shorter service life of the cable.

SUMMARY OF THE INVENTION

It is an object of the present invention to provide a water impervious rubber or plastic insulated power cable free from the drawbacks of the conventional water impervious power cable, which has, as a water impervious layer, a lead foil with a layer of an electrically conductive rubber or plastic formed on at least one surface thereof, so that the metal (lead) tape in the water impervious layer may be electrically in contact with the shield layer along the entire length of the cable, thereby preventing the formation by an induced voltage of pinholes in the water impervious layer and the resultant degradation in the water impervious characteristics of the cable.

In order to achieve this object, there is provided according to the present invention a rubber or plastic insulated power cable having a cable core and an outermost jacket, the cable core including an extruded conductor shield, an insulation layer of rubber or plastic, an extruded insulation shield, and a metal shield which are formed sequentially around a conductor, wherein a water impervious layer is formed on the metal shield layer, with an electrically conductive tape layer applied in between, by longitudinally laying thereon a laminated tape comprising a lead foil tape coated at least one surface thereof with an electrically conductive rubber or plastic having a conductivity of $10^7$ $\Omega$·cm or less (hereinafter referred to as a water impervious tape), in such a manner that most of the surface of the layer of the electrically conductive rubber or plastic is in contact with the metal shield layer with the electrically conductive tape layer, thereby electrically connecting the metal shield layer and the water impervious tape and keeping the lead foil tape in the water impervious tape and the metal shield layer at the same potential. The power cable of the present invention can thus prevent any trouble arising from an induced voltage.

BRIEF DESCRIPTION OF THE DRAWINGS

FIG. 2 is a sectional view showing an example of a cable construction of a water impervious rubber or plastic insulated power cable according to an embodiment of the present invention.

DETAILED DESCRIPTION OF THE PREFERRED EMBODIMENTS

Figure 1:
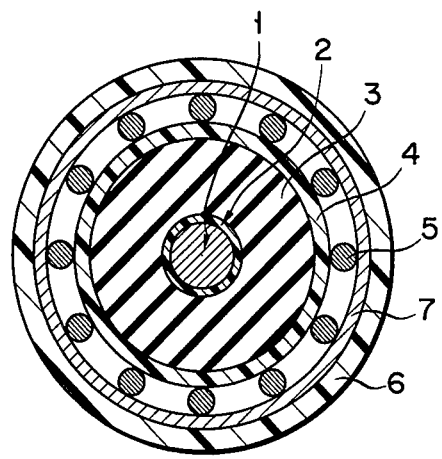
FIG. 1 is a sectional view showing an example of a cable structure of a conventional water impervious rubber or plastic insulated power cable.

According to the power cable of the present invention, a water impervious layer 7 is formed on a metal shield layer 5, with an electrically conductive tape layer 8 applied in between. No electrical problem is encountered with a power cable in which a water impervious layer is directly formed on a metal shield layer without an electrically conductive tape layer interposed therebetween, and a jacket is formed therearound. However, with a cable of this construction, the metal foil layer is subject to fatigue due to friction between the metal shield layer and the jacket (caused by winding or rewinding of the cable on or from a reel during cable manufacture, or the heat cycle by a power load during operation after cable installation). The cable may finally break down degrading its water impervious performance.

However, in the cable of the present invention, the electrically conductive tape layer 8 is interposed between the metal shield layer 5 and the water impervious layer 7. Therefore, the metals of the metal shield layer 5 and the water impervious layer 7 do not directly contact each other. Even if the cable is bent, the electrically conductive tape layer 8 absorbs the generated mechanical stress, resolving the problem of the conventional cable as described above. For this purpose, the electrically conductive tape layer 8 preferably has a thickness of 100 μm or more.

In accordance with the present invention, a lead foil layer is used as the metal tape for the water impervious layer for the following reason. Lead is superior in chemical resistance to aluminum, copper, stainless steel and the like. Furthermore, even if lead is left in contact with the electrically conductive carbon in the electrically conductive rubber or plastic composition in the presence of water, it is not corroded and remains water-impervious and chemical-resistant for a long period of time.

The water impervious tape to be used in the present invention has an electrically conductive rubber or plastic layer on at least one surface of a lead foil layer. Therefore, if the electrically conductive rubber or plastic layer is formed only on one surface of the lead foil layer, an electrically conductive or electrically nonconductive rubber or plastic layer may be formed on the other surface of the lead foil layer, depending on the material of a jacket 6 formed around the water impervious layer 7.

The base material for the electrically conductive rubber or plastic tape to be formed on at least one surface of the lead foil tape may include rubbers and plastics such as low-, medium- or high-density polyethylene, polypropylene, polybutene-1, polymethylpentene, an ethylene-propylene copolymer, ionomer, an ethylene-ethylacrylate copolymer, an ethylene-vinyl acetate-vinyl chloride graft copolymer, chlorinated polyethylene, chlorosulfonated polyethylene, an ethylene-acrylic acid copolymer, isoprene rubber, chloroprene rubber, acrylonitrile-butadiene rubber, or styrene-butadiene rubber. A suitable amount of a conductive rendering agent such as an electrically conductive carbon black is added to the selected rubber or plastic to provide the electrically conductive rubber or plastic tape. KETJEN BLACK EC (available from Akzo Chemie, Nederland) is particularly preferable as the electrically conductive carbon black since it renders the rubber or plastic highly conductive with the addition of a small amount.

The electrically conductive rubber or plastic for the water impervious tape and the electrically conductive tape layer 8 to be formed immediately thereunder must have a resistivity of $10^7$ $\Omega$·cm or less. This is to prevent a surge voltage from being induced in the lead foil layer of the water impervious tape.

The material of an insulation layer 3 of the cable of the present invention may be an electrically insulating composition selected from crosslinked polyethylene, polyethylene, ethylene-propylene rubber, and butyl rubber. The material of the metal shield layer 5 may generally be a metallic material selected from a copper tape, an aluminum copper, a copper wire, and an aluminum wire. The rubber or plastic material of the jacket 6 to be formed integrally with the water impervious layer 7 may be an electrically insulating composition selected from polyvinyl chloride, polyethylene, crosslinked polyethylene, or rubber; or an electrically conductive composition comprising a mixture thereof with a suitable amount of an electrically conductive carbon black or the like.

The construction and effects of the cable of the present invention will now be described by way of its examples.

EXAMPLE 1

A conductor shield, an insulation layer of polyethylene and an insulation shield were simultaneously extruded on an aluminum conductor consisting of 19 stranded aluminum wires, each a 1.9 mm in diameter. The conductor shield and the insulation shield both consisted of a conductive composition which was obtained by mixing a conductive carbon black with a base polymer comprising a blend of ethylene-ethylacrylate (EEA) and low-density polyethylene (PE). After spirally winding a tin-plated copper wire of 1.6 mm diameter around the obtained construction, two layers of a conductive tape 0.1 mm thick consisting of a nylon cloth as a support with its each surface coated with a conductive compound were wound with a ½ lap thereover to provide a cable core. A water impervious tape was prepared by adhering a 0.1 mm thick conductive vinyl sheet with a conductive adhesive on each surface of a lead foil tape 0.05 mm thick. The water impervious tape thus obtained was longitudinally laid on the cable core. After heat-sealing the lap portion of the water impervious tape, a conductive compound consisting of polyvinyl chloride and a conductive carbon black was directly extruded therearound. Heat of extrusion of the conductive composition formed the water impervious tape and the jacket integrally with each other, thereby providing a 15 kV cable having an Al conductor of 1/0 AWG.

EXAMPLE 2

A conductor shield, an insulation layer of crosslinked polyethylene, and an insulation shield were simultaneously extruded on an aluminum conductor consisting of 19 stranded aluminum wires each having a diameter of 1.9 mm. The conductor shield and the insulation shield both consisted of a conductive composition which was obtained by mixing an ethylenepropylene rubber as a base polymer with a conductive carbon black. A metal shield layer was formed therearound with a copper tape 0.1 mm thick. A 0.15 mm thick conductive tape was then obtained by coating two surfaces of a "polyester" cloth as a support with a conductive compound. One layer of the conductive tape was wound around the metal shield layer with a ½ lap to provide a cable core. A water impervious tape was prepared by coating, to a thickness of 0.10 mm, two surfaces of a 0.03 mm thick lead foil tape with a conductive composition consisting of a conductive carbon and a blend of an ethylene-acrylic acid copolymer (EAA) with PE. The water impervious tape was longitudinally laid on the cable core. After the lap portion of the water impervious tape was heat-sealed, the conductive compound as described above was extruded to form a jacket. Heat of the extrusion formed the water impervious tape and the jacket integrally with each other, thereby providing a 15 kV cable having an Al conductor of 1/0 AWG.

EXAMPLE 3

A conductor shield, an insulation layer of ethylene-propylene rubber, and an insulation shield were simultaneously extruded on an aluminum conductor consisting of 19 stranded aluminum wires each having a 1.9 mm diameter. The conductor shield and the insulation shield both consisted of a conductive composition which was obtained by mixing a conductive carbon black with a base polymer comprising a blend of EEA and PE. After a 1.6 mm diameter aluminum wire is wound spirally around the insulation shield, one layer of a 0.1 mm thick conductive tape obtained by coating two surfaces of a polypropylene sheet as a support with a conductive compound was wound ½ lap to provide a cable core. A water impervious tape was prepared by adhering, with a conductive adhesive, a 0.1 mm thick conductive vinyl sheet on one surface of a lead foil tape 0.05 mm thick and a 0.05 mm thick insulating vinyl sheet on the other surface thereof. The water impervious tape was longitudinally laid on the cable core so that the conductive vinyl sheet contacted the conductive tape of the cable core. After the lapped portion of the water impervious tape was sealed by heat, a polyvinyl chloride compound was extruded to form a jacket. Heat of the extrusion formed the water impervious tape and the jacket integrally with each other, thereby providing a 15 kV cable having an Al conductor of 1/0 AWG.

COMPARATIVE EXAMPLE 1

A 15 kV cable having an Al conductor of 1/0 AWG was obtained following the procedures of Example 1 except for the following details. A cable core was obtained by spirally winding a tin-plated copper wire of 1.6 mm diameter on an insulation shield and winding two layers of a 0.1 mm thick unwoven nylon fabric with a ½ lap. A water impervious tape was obtained by coating two surfaces of a 0.2 mm thick aluminum tape with EAA to a thickness of 0.05 mm. The water impervious tape was longitudinally laid on the cable core. After the lapped portion of the water impervious tape was sealed by heat, PE was extruded to form a jacket.

COMPARATIVE EXAMPLE 2

The same procedures as those in Example 2 were followed except for the following details. For preparing a cable core, a metal shield layer of a 0.1 mm thick copper tape was wound on an insulation shield and one layer of a 0.2 mm thick unwoven polyester fabric was wound thereover with a ½ lap. A water impervious tape was prepared by laminating a 0.05 mm thick rigid vinyl tape on two surfaces of a 0.05 mm thick copper foil tape. The water impervious tape was longitudinally laid on the cable core. After the lapped portion of the water impervious tape was heat-sealed, a polyvinyl chloride compound was extruded to form a jacket. A 15 kV cable having an Al conductor of 1/0 AWG was obtained.

COMPARATIVE EXAMPLE 3

The same procedures as those in Example 3 were followed except for the following details. For obtaining a cable core, a 1.6 mm diameter aluminum wire was spirally wound on an insulation shield. A water impervious tape was obtained by coating two surfaces of a 0.2 mm thick aluminum tape with EAA to a thickness of 0.05 mm. After the water impervious tape was longitudinally laid on the cable core, the lapped portion was heat-sealed. A high-density polyethylene was extruded thereover to form a jacket. A 15 kV cable having an Al conductor of 1/0 AWG was prepared.

COMPARATIVE EXAMPLE 4

The same procedures as those in Example 4 were substantially followed except for the following details. For obtaining a cable core, a 1.6 mm diameter tin-plated copper wire was wound around an insulation shield and two layers of a 0.1 mm thick conductive tape obtained by coating two surfaces of a nylon cloth as a support with a conductive compound were wound therearound with a ½ lap. A water impervious tape was obtained by adhering, with a conductive adhesive, a conductive vinyl sheet 0.1 mm thick on one surface of a 0.05 mm thick aluminum foil tape and a 0.1 mm thick insulating polyvinyl chloride sheet on the other surface thereof. The water impervious tape was longitudinally laid on the cable core so that the conductive vinyl sheet contacted the conductive tape of the cable core. After the lapped portion of the water impervious tape was sealed by heat, a polyvinyl compound was extruded to form a jacket. A 15 kV cable having an Al conductor of 1/0 AWG was prepared.

COMPARATIVE EXAMPLE 5

The same procedures as those in Example 1 were followed except for the following details. For preparing a cable core, a 1.6 mm diameter tin-plated copper wire was spirally wound around an insulation shield and two layers of a 0.1 mm thick conductive tape obtained by coating each surface of a nylon cloth as a support with a conductive compound were wound with a ½ lap. A water impervious tape was prepared by coating, to a thickness of 0.05 mm, each surface of a 0.03 mm thick aluminum foil tape with a conductive composition obtained by mixing a conductive carbon black with a blend of EAA and PE. The water impervious tape thus obtained was longitudinally laid on the cable core. After the lapped portion was sealed by heat, the conductive composition as the one used for the conductor shield was extruded to form a jacket. A 15 kV cable having an Al conductor of 1/0 AWG was thus prepared.

The cables of the Examples and Comparative Examples described above were subjected to the tests as shown in Table 1 below to determine their characteristics. The obtained results are shown in Table 2 below.

TABLE 1

| 1 | Conductivity evaluation test | Electrical resistance between metal of water impervious tape and metal shield layer of cable core (with tester) |
|---|---|---|
| 2 | Water immersion load test | After each cable was bent five times in each of two opposite directions around a mandrel having a diameter 10 times the outer diameter of the cable, it was immersed in water at 70° C. and loaded with an AC voltage of 15 kV at 50 Hz for 1 year. The electrical characteristics, the bow-tie tree, the water content, and the like, were examined. |

TABLE 2

|  | Insulation initial water content (%) | Insulation water content after immersion in 70° C. water for one year (%) | Bow-tie tree (50μ long or longer) in insulation after immersion in 70° C. water for one year | Resistance between metal of water impervious tape and metal shield layer (Ω) | Corrosion state of metal of water impervious tape after immersion in 70° C. water for one year |
|---|---|---|---|---|---|
| Example 1 | <0.01 | <0.01 | Not observed | $10^4$ | No pinholes or cracks in Pb |
| Example 2 | <0.01 | <0.01 | Not observed | $10^3$ | No pinholes or cracks in Pb |
| Example 3 | <0.01 | <0.01 | Not observed | $10^4$ | No pinholes or cracks in Pb |
| Comparative Example 1 | <0.01 | 0.02 ~0.04 | Observed | ∞ | Wrinkles and pinholes in Al |
| Comparative Example 2 | <0.01 | 0.03 ~0.05 | Observed | ∞ | Cracks and discoloring in Cu |
| Compara- | <0.01 | 0.01 | Observed | ∞ | Wrinkles and |

TABLE 2-continued

| | Insulation initial water content (%) | Insulation water content after immersion in 70° C. water for one year (%) | Bow-tie tree (50μ long or longer) in insulation after immersion in 70° C. water for one year | Resistance between metal of water impervious tape and metal shield layer (Ω) | Corrosion state of metal of water impervious tape after immersion in 70° C. water for one year |
|---|---|---|---|---|---|
| tive Example 3 | | ~0.03 | | | pinholes in Al |
| Comparative Example 4 | <0.01 | 0.03 ~0.05 | Observed | $10^4$ | Wrinkles and pinholes in Al |
| Comparative Example 5 | <0.01 | 0.05 ~0.07 | Observed | $10^4$ | Through pinholes in Al |

As may be seen from Table 2 above, with the cables of the Examples of the present invention, an expected resistance of $10^3$ to $10^4$ Ω was obtained. No abnormalities such as formation of pinholes or cracks were observed in lead after the water immersion load test by immersion in hot water for 1 year. The water content in the cable insulation remained the same as the initial water content, and no bow-tie tree was observed. Furthermore, the electrical characteristics after the test remained substantially the same as those prior to the test, thus resulting in substantially no degradation of cable performance.

On the other hand, with the cables of Comparative Examples 1 to 3, no electrical conduction was obtained between the metals of the water impervious tape and the metal shield layer. When the cables were disassembled after the immersion load test for 1 year, wrinkles, pinholes, cracks, discoloration, corrosion and the like were observed when aluminum and copper were used as the metals of the water impervious tape. The water content of the insulation slightly increased, and the bow-tie tree was also observed.

It is assumed that the wrinkles in aluminum and copper were formed during bending, and water infiltrated into the cable core during the test to cause discoloration and corrosion of aluminum and copper.

With the cables of Comparative Examples 4 and 5, pinholes were formed in aluminum of the water impervious layer after the test. Due to water infiltration into the cable core through the pinholes, the water content of the insulation increased and the bow-tie tree was observed in the insulation. It is assumed that the pinholes were formed in aluminum due to electrical corrosion between aluminum and the electrically conductive carbon under the presence of water.

In sum, a water impervious rubber or plastic power cable of the present invention does not cause corrosion in lead of the water impervious tape after the immersion load test, thus providing a stable water impervious effect. Furthermore, since lead of the water impervious tape and the shield metal are electrically connected, no voltage is induced in lead, further providing an excellent water impervious rubber or plastic insulated power cable with stable performance over a long period of time.

What is claimed is:

1. In a rubber or plastic insulated power cable comprising a cable core having a conductor, an extruded conductor shield, a rubber or plastic insulation layer and an extruded insulation shield; a metal shield layer; and an outermost jacket, the improvement comprising:
an electrically conductive tape layer formed on said metal shield layer; and
a water impervious layer including a laminated tape of a lead foil tape with an electrically conductive rubber or plastic layer formed on at least one surface thereof, said water impervious layer being longitudinally laid over said electrically conductive tape layer such that said electrically conductive rubber or plastic layer faces said metal shield layer; and
said water impervious layer being securely adhered to an inner surface of said jacket.

2. A power cable according to claim 1, wherein said insulation layer of said cable core comprises an electrically insulating composition selected from the group consisting of crosslinked polyethylene, polyethylene, ethylene-propylene rubber and butyl rubber.

3. A power cable according to claim 1, wherein said metal shield layer of said cable core comprises a metallic material selected from the group consisting of a copper tape, an aluminum tape, a copper wire, and an aluminum wire.

* * * * *